(12) United States Patent
Takayanagi

(10) Patent No.: US 7,677,608 B2
(45) Date of Patent: Mar. 16, 2010

(54) QUICK CONNECTOR

(75) Inventor: Akira Takayanagi, Nishikasugai-gun (JP)

(73) Assignee: Tokai Rubber Industries, Ltd. (JP)

( * ) Notice: Subject to any disclaimer, the term of this patent is extended or adjusted under 35 U.S.C. 154(b) by 706 days.

(21) Appl. No.: 11/475,648

(22) Filed: Jun. 27, 2006

(65) Prior Publication Data

US 2006/0267341 A1  Nov. 30, 2006

(51) Int. Cl.
*F16L 39/00* (2006.01)
(52) U.S. Cl. .................. 285/319; 285/305; 285/921
(58) Field of Classification Search .............. 285/67, 285/305, 308, 319, 321, 325, 921
See application file for complete search history.

(56) References Cited

U.S. PATENT DOCUMENTS

| | | | |
|---|---|---|---|
| 5,951,063 A | 9/1999 | Szabo | |
| 6,293,596 B1 * | 9/2001 | Kinder | 285/305 |
| 6,637,779 B2 * | 10/2003 | Andre | 285/305 |
| 2003/0034648 A1 * | 2/2003 | Zitkowic et al. | 285/120.1 |
| 2003/0090109 A1 * | 5/2003 | Ostrander et al. | 285/305 |
| 2003/0197373 A1 * | 10/2003 | Stieler | 285/308 |
| 2005/0189764 A1 * | 9/2005 | Ono | 285/305 |

FOREIGN PATENT DOCUMENTS

| | | |
|---|---|---|
| EP | 0 530 778 | 9/1992 |
| EP | 0 936 394 | 9/1995 |
| JP | 2002-276878 | 9/2002 |
| WO | 03/031861 A1 | 4/2003 |

OTHER PUBLICATIONS

French Search Report for Patent Application No. BR41313/CR/AL, issued Feb. 12, 2007.

* cited by examiner

*Primary Examiner*—Aaron M Dunwoody
*Assistant Examiner*—Fannie Kee
(74) *Attorney, Agent, or Firm*—Andrus, Sceales, Starke & Sawall, LLP

(57) ABSTRACT

When a retainer is mounted on or in a retainer mounting portion and is positioned at an inserting position, a pipe is inserted into the retainer mounting portion. An annular engaging projection of the pipe advances in the connector housing while spreading leg portions of the retainer outwardly. When the annular engaging projection reaches a connecting position, the retainer is automatically moved to an engaging position and snap-engages with the annular engaging projection.

17 Claims, 8 Drawing Sheets

QUICK CONNECTOR

BACKGROUND OF THE INVENTION

1. Field of the Invention

The present invention relates to a quick connector, for example, to be adapted for connection of gasoline fuel piping for a motor vehicle, more specifically, a quick connector having a connection verifying function for verifying that a pipe is correctly fitted in and connected to the quick connector.

2. Description of the Related Art

In a fluid piping such as gasoline fuel piping wherein a connector or a quick connector is used for connecting a pipe and a mating member, for example, the pipe includes an inserting end portion on an inserting end thereof wherein an annular engaging projection is formed on an outer peripheral surface, while the connector is provided with retainer means. The inserting end portion of the pipe is relatively inserted into the connector so that the annular engaging projection snap-engages with the retainer means to provide locking relation between the pipe and the connector, and thereby the connector is connected to the pipe. The connector or the quick connector used in this manner has a tubular connector housing including a tube connecting portion on one axial end and a retainer mounting portion on the other axial end thereof, and a retainer mounted on or in the retainer mounting portion of the connector housing. When the inserting end portion of the pipe is inserted into an opening or aperture of an axial edge of the connector or the connector housing, the annular engaging projection of the pipe advances in the connector while deforming the retainer, and the annular engaging projection, for example, passes through the retainer or reaches an engaging portion such as an engaging slit formed in the retainer, namely, the annular engaging projection reaches a connecting position, the retainer returns, for example, to its original shape before deformed due to its spring-back force, and is brought into snap-engagement (lock engagement) with the annular engaging projection.

Hence, in case of this type of a quick connector, an operator has to connect the pipe and the quick connector with a great deal of attention. Otherwise, there is a possibility that the inserting end portion of the pipe is not fully inserted into the retainer mounting portion of the connector housing, namely, so-called incorrect connection, wherein, for example, the annular engagement projection does not pass through the retainer or does not reach an engaging portion of the retainer, is made between the quick connector and the pipe. However, in case of a piping system subject to operation while the pipe is incorrectly connected to the quick connector, the inserting end portion of the pipe is retracted to a position of sealing member that provides a seal between the connector housing and the pipe, namely is moved to the other axial end during operation, and sealing property by the sealing member between the connector housing and the pipe is insufficient or becomes lowered, and, as a result, an internal fluid might leak out.

Then, connection verifying means for a pipe and a quick connector is demanded in order to verify fit-in relation between the pipe and the quick connector. One of known type of such connection verifying means for a pipe and a connector is a checker that is configured to be fitted to or mounted on or in the connector housing before the pipe is inserted in a connector housing. The checker can be removed from the connector housing only when the pipe is correctly fitted in or connected to the connector housing. However, such connection verifying means allows an operator to verify correct connection between the pipe and the connector only once. So, another connection verifying means of double-lock type is used that allows the operator to verify complete connection each time the pipe is connected to the connector housing, that is, to verify correct connection even when the pipe that is once disconnect from the connector is reinserted in the connector housing (for example, refer to Patent Document 1). Here, a retainer is configured to be fitted or mounted in the connector housing after the pipe is inserted in the connector housing. And, when the pipe is incorrectly fitted in the connector housing, the annular engaging projection becomes an obstacle to mount the retainer on the connector housing.

[Patent Document 1] JP-A 2002-276878

And, in such connection verifying means, the retainer is mounted on the connector housing every time the pipe that is once disconnected from the connector housing is connected to the connector again, and therefore it is always possible to detect incorrect connection between the pipe and the connector. Further, since the retainer itself has connection verifying function, it is advantageous that the connector can be provided at lower cost compared to the case where the connection verifying device is configured separately from the retainer.

However, in this case, the connector is not configured as a quick connector. Namely, for connection of the pipe and the connector housing, an operator is required to perform two annoying operations, i.e., insertion of the pipe into the connector housing and mounting of the retainer on the connector housing. This complicates connecting work for the pipe and the connector. And, there could be a fear that connection of the pipe is finished without performing later subsequent process such as mounting of the retainer. So, it is difficult to achieve high reliability with piping arrangement with the connector as disclosed in the Patent Document 1.

Under the circumstances described above, it is an object of the present invention to provide a quick connector that is inexpensive and allows an operator to easily construct secure piping arrangement.

SUMMARY OF THE INVENTION

In order to achieve a foregoing object, there is provided a novel quick connector for connecting a pipe having an annular engaging projection and a mating member (a tube). The quick connector comprises a connector housing that is provided with a tube connecting portion on one axial end and a retainer mounting portion on the other axial end, and a retainer that is mounted in the retainer mounting portion for snap-engaging (engaging by means of springback force or spring force of the retainer, etc.) with the annular engaging projection when the pipe is inserted in the connector housing and the annular engaging projection of the pipe reaches a connecting position (a position or axial position which the annular engaging projection reaches when the pipe is connected to the quick connector correctly). The retainer mounting portion has a first positioning engagement portion and a second positioning engagement portion. The retainer has a retainer body that is provided with a pair of leg portions on widthwise opposite ends of the retainer body. Each of the leg portions includes a positioning stop portion. And, a moving mechanism for moving the retainer body in a radial direction (namely, moving the retainer body from an inserting position to an engaging position) is provided between the retainer mounting portion and the retainer or on the retainer. The positioning stop portions are formed so as to engage with the first positioning engagement portion, for example, pinch or grasp widthwise opposite ends of the first positioning engagement portion in engaging relation therewith to position or locate the retainer body at the inserting position, and engage with the second positioning engagement portion, for example, pinch or grasp widthwise opposite ends of the second positioning engagement portion in engaging relation therewith to position or locate the retainer body at the engaging position that is spaced radially from the inserting position. The annular engaging projection advances while spreading or pushing the pair of the leg portions outwardly to cancel engaging relation between the positioning stop portion and the first positioning engagement portion by inserting the pipe in the connector housing while the retainer body is positioned or located at the inserting position. The retainer body is automatically moved to the engaging position by the moving mechanism so as to engage with the annular engaging projection in locking relation and the positioning stop portion is positioned or located in engaging relation with the second positioning engagement portion, once the annular engaging projection of the pipe reaches the connecting position. Here, an operator can verify correct connection between the pipe and the connector by inserting the pipe in the connector housing and checking movement or positional change of the retainer or the retainer body in the radial direction. So, the operator can simultaneously finish verification of correct connection as well as insertion and connection of the pipe to the quick connector. The retainer or the retainer body that remains, for example, at the inserting position indicates that the pipe is not inserted in or connected to the quick connector correctly, the operator inserts the pipe therein again, or inserts the pipe further therein. The retainer or the retainer body that is displaced or moved to the engaging position indicates that the pipe is inserted in or connected to the quick connector correctly. The operator can disconnect the pipe from the connector housing, for example, by canceling engagement between the positioning stop portions and the second positioning engagement portion and returning the retainer to the inserting position. Or the operator can disconnect the pipe from the quick connector by dismounting or removing the retainer from the retainer mounting portion. And, in the case of reinserting the pipe in the connector housing or reconnecting the pipe thereto, for example, the retainer or the retainer body is held or mounted in the retainer mounting portion, at the inserting position. In this manner, every time the operator inserts or reinserts the pipe in the connector housing, he or she can verify whether the pipe is inserted in the connector housing correctly. The retainer or the retainer body is, for example, disposed in or within the retainer mounting portion movably in the radial direction. In the present invention, no separate member is necessary as checker or connection verifying device. This allows to reduce parts count required for the quick connector or to design an axial length of the retainer mounting portion short. The retainer body or the retainer may be in a form of U-shape or horseshoe-shape. And, the retainer body may have a pipe engaging portion and the pair of leg portions may be provided integrally on widthwise opposite ends of the pipe engaging portion. When the retainer body or the retainer is moved to the engaging position, the pipe engaging portion engages with the annular engaging projection of the pipe in locking relation.

In order to verify connection state of the pipe and the connector housing clearly, the retainer may be constructed such that the retainer body projects outwardly with respect to the retainer mounting portion at the inserting position, and outwardly projecting length thereof with respect to the retainer mounting portion changes at the engaging position. And, in order to verify connection state of the pipe and the connector housing more clearly, the retainer may be constructed such that the retainer body completely enters or is hidden inside the retainer mounting portion at the engaging position. In this construction, since the retainer is protected by the retainer mounting portion, it is prevented that the retainer is damaged by external mechanical shock and thereby the pipe is unintentionally detached or disconnected from the connector housing.

The moving mechanism may include a spring member for biasing the retainer body in the radial direction. In this case, the spring member may be constructed to be pushed and deformed by the pair of the leg portions that are pushed and spread outwardly by the annular engaging projection of the pipe and to thereby exert a spring force to the retainer body in the radial direction. The spring member may be provided on the retainer or the retainer body. Or, the spring member may be provided on the retainer mounting portion.

As described above, a quick connector according to the present invention allows an operator to verify complete connection of a pipe and a connector housing simultaneously at a time of inserting the pipe in the connector housing.

Now, the preferred embodiments of the present invention will be described with reference to the drawings.

DETAILED DESCRIPTIONS OF PREFERRED EMBODIMENTS

Figure 1:
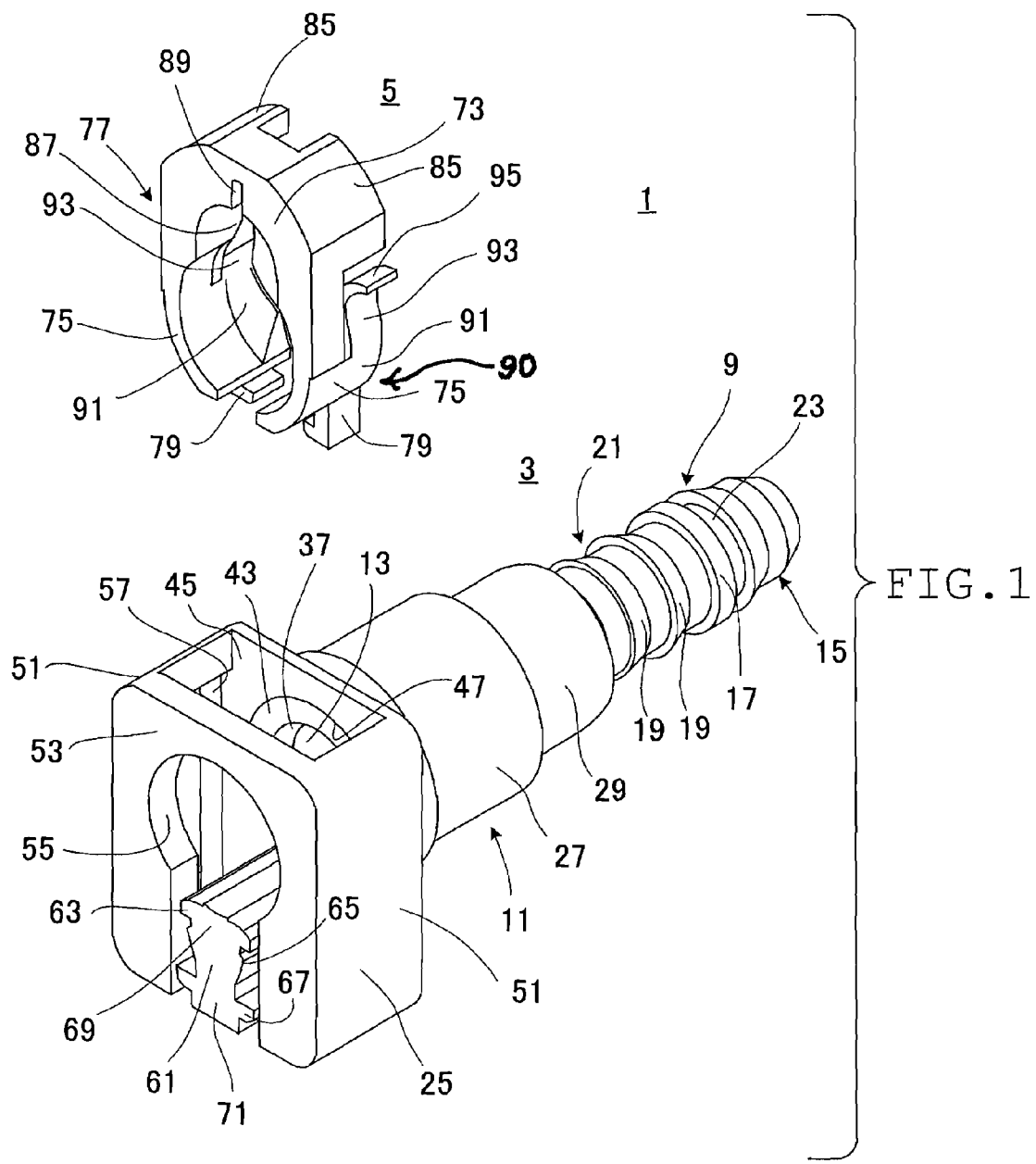
FIG. 1 is a exploded, perspective view of a quick connector according to the present invention.

A quick connector 1 shown in FIG. 1 is used for connection in gasoline fuel piping for a motor vehicle. The quick connector 1 generally has a tubular connector housing 3, a retainer 5 formed into a U-shape and of relatively thick-wall, and a seal member 7. The connector housing 3, made of glass fiber reinforced polyamide (PA/GF), has a tubular resin-tube connecting portion 9 on one end along an axis of the connector housing 3, namely on one axial end of the connector housing 3, and a pipe inserting portion 11 on the other end along the axis thereof, namely, the other axial end thereof, in integral unitary relation, and includes a through bore 13 extending therethrough from one edge to the other edge along the axis thereof, namely from one axial edge to the other axial edge thereof. The resin-tube connecting portion 9 includes a one axial end portion 15 and the other axial end portion 21 on the other axial end of the resin-tube connecting portion 9 with respect to the one axial end portion 15. The one axial end portion 15 includes an outer peripheral surface generally diametrically expanding gently in a direction away from an open edge of the one axial end portion 15, i.e., in the other direction along the axis of the resin-tube connecting portion 9, or the other axial direction (the outer peripheral surface includes a uniform diameter portion in an axially middle portion thereof). On the other hand, the other axial end portion 21 includes an outer peripheral surface generally extending like a cylindrical outer surface which is formed like an annular stop rib 17 of square cross section, and two annular stop ribs 19 of right triangle cross-section diametrically expanding in the other axial direction. The annular stop rib 17 and the annular stop ribs 19 are spaced apart sequentially in an axial direction, from one axial end toward the other axial end, respectively. The resin tube is tightly fitted on an outer periphery or an outer peripheral surface of the resin-tube connecting portion 9 and thereby the resin tube is connected to the quick connector 1. An outer peripheral surface 23 of the other axial end portion 21 on one axial edge (between the one axial end portion 15 and the annular stop rib 17) is formed with a small diameter or formed in a relatively deep annular groove. A seal ring (not shown) is disposed on the outer peripheral surface 23 when or before the resin tube is fitted to the resin-tube connecting portion 9.

Figure 2:
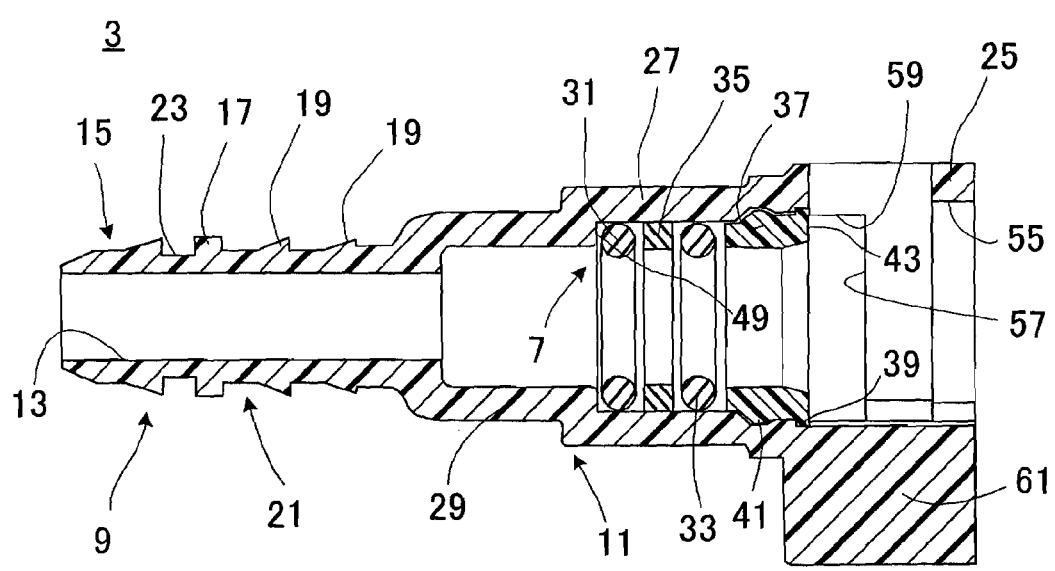
FIG. 2 is a sectional view of a connector housing.
Figure 3:
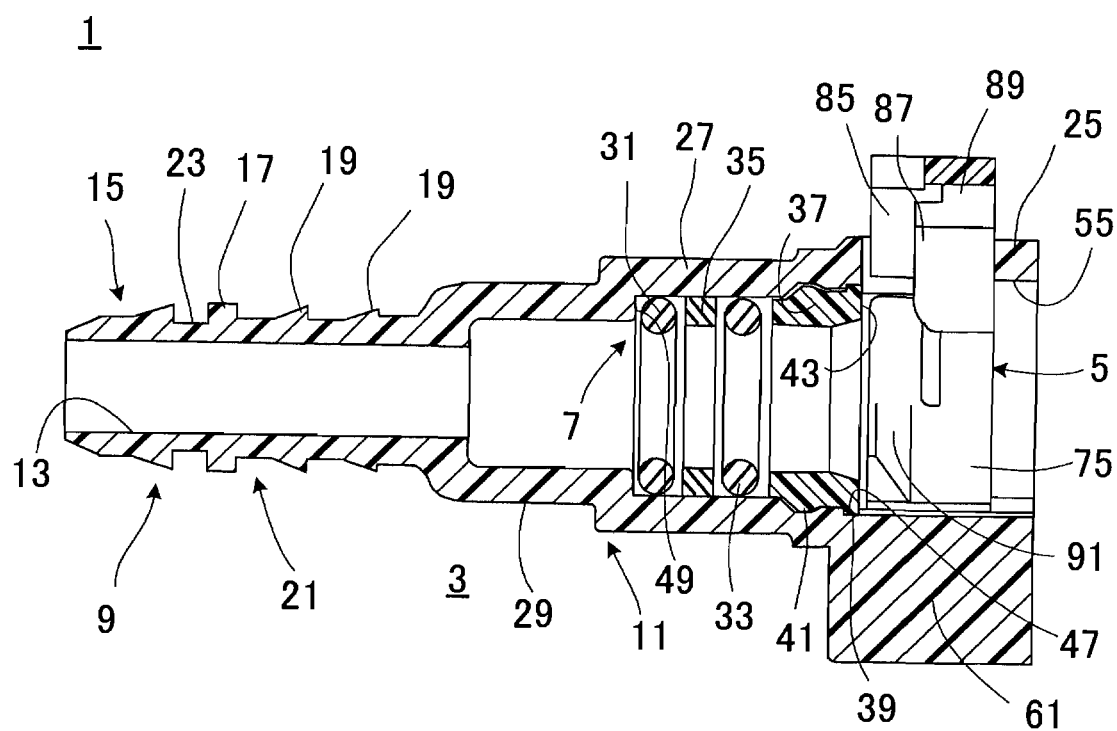
FIG. 3 is a sectional view of the quick connector.
Figure 4:
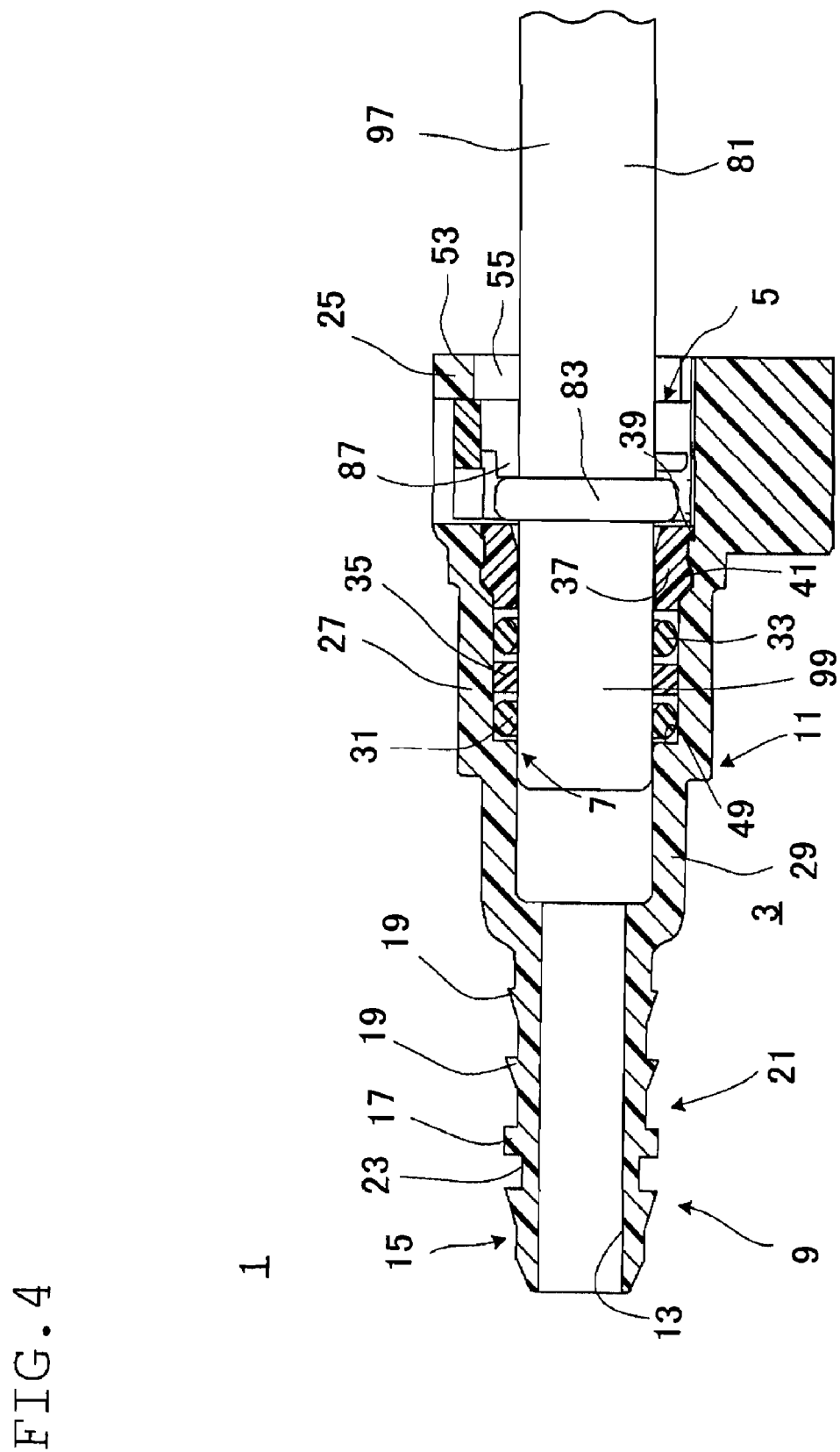
FIG. 4 is a sectional view showing a state that a pipe is connected to the quick connector.

As well shown in FIG. 2, the pipe inserting portion 11 of the connector housing 3 integrally has a retainer mounting portion 25 of a hollow rectangular parallelepiped on the other axial end thereof, a seal holding portion 27 with an outer diameter slightly smaller than a width of the retainer mounting portion 25 on an axial middle thereof, and a transitional portion 29 with a diameter smaller than the seal holding portion 27 on one axial end thereof. In one axial end of an inner peripheral surface of the seal holding portion 27, a first O-ring 31 of one axial end and a second O-ring 33 of the other axial end are fitted with an intervening collar 35 therebetween, namely in axially spaced, side by side relation, and in the other axial end of the inner peripheral surface of the seal holding portion 27, a short cylindrical resin bush 37 is fitted. The resin bush 37 has an inner diameter generally equal to an inner diameter of the transitional portion 29. The resin bush 37 is formed integrally with annular projecting portions 39, 41 slightly projecting radially outwardly on the other axial end portion and the axial middle portion of an outer peripheral surface thereof, respectively. As well shown in FIG. 3, the other axial end portion of an inner peripheral surface of the seal holding portion 27 (more specifically, the other axial end portion of an inner peripheral surface of the seal holding portion 27 and an inner peripheral surface of the transit hole 47) has a shape corresponding to a shape of the outer peripheral surface of the resin bush 37. The resin bush 37 is fitted in the seal holding portion 27 and the transit hole 47 formed in the one axial end wall-portion 45 for transition to the seal holding portion 27, such that an annular end surface 43 of the other axial end is coplanar with an inner surface of the one axial end wall portion 45 of the retainer mounting portion 25. The first and second O-rings 31, 33 are axially retained between an annular stepped surface 49 that is defined on one axial edge inside the seal holding portion 27 and the resin bush 37. The first O-ring 31 is made, for example, of fluoro-rubber (FKM) that is excellent in waterproof and dust-proof and has high resistance to gasoline and ozone. The second O-ring 33 is made, for example, of fluoro-silicone rubber (FVMQ) that is excellent in waterproof and dust-proof and has high resistance to low-temperature and ozone.

As well shown in FIG. 1, a rectangular parallelepiped retainer mounting portion 25 of the pipe inserting portion 11 has a pair of side wall portions 51, 51 that are formed integrally on widthwise opposite sides (radially opposite sides) of the one axial end wall portion 45 formed continuously from the seal holding portion 27, and the other axial end wall portion 53 that is formed integrally on the other axial edges of the pair of the side wall portions 51, 51. The retainer holding portion 25 is constructed in a form of a hollow member including openings in an upper surface (one radial end surface between the side wall portions 51, 51) and in a lower surface (the other radial end surface between the side wall portions 51, 51), respectively. The other axial end wall portion 53 is formed with an insertion aperture 55 that has a diameter generally equal to that of the transit hole 47 in the one axial end wall portion 45 (or, for example, slightly larger than that of the transit hole 47) in coaxial relation with the transit hole 47. A portion of the other axial end wall portion 53 from a lower end of the insertion aperture 55 to a lower edge of the other axial end wall portion 53 is cut out. Each of the side wall portions 51, 51 includes a guide recess 57 extending from an upper end portion to a lower edge in one axial end of an inner surface thereof. On an upper edge of the guide recess 57, a support stepped portion 59 is provided.

The one axial end wall portion 45 of the retainer mounting portion 25 is provided integrally with a positioning engagement member 61 on its inner surface, under the transit hole 47 and at a widthwise center position. The positioning engagement member 61 extends in the other axial direction, with the other axial end portion reaching in the cutout opening under the insertion aperture 55. The positioning engagement member 61 has a generally rectangular cross-section (elongated vertically), but has a pair of first projecting portions 63, 63 that project laterally on widthwise opposite ends of an upper end portion thereof, a pair of protrusive portions 65, 65 that protrude laterally on widthwise opposite ends thereof under the first projecting portions 63, 63 and a pair of second projecting portions 67, 67 that project laterally on widthwise opposite ends of a portion near a lower edge thereof. Outer opposite surfaces extending from the protrusive portions 65, 65 toward the second projecting portions 67, 67 are sloped inwardly toward a lower end, respectively (outer opposite surfaces close to the second projecting portions 67, 67 extend vertically, respectively). In the positioning engagement member 61, a region of the first projecting portions 63, 63 (upper end portion) defines a first positioning engagement portion 69, while a region of the second projecting portions 67, 67 (lower end portion) defines a second positioning engagement portion 71 (also refer to FIG. 5).

The retainer 5 made of polyamide (PA) is received and fitted in the retainer mounting portion 25. This retainer 5 is relatively flexible, and is formed so as to be resiliently deformable. As best shown in FIG. 1, the retainer 5 has a retainer body or main body 77 that is provided with a pipe engaging portion 73 and a pair of leg portions 75, 75 formed integrally on widthwise opposite ends, widthwise opposite edge sides or widthwise opposite end portions of the pipe engaging portion 73 (the pipe engaging portion 73 excluding an outer wall portion 85, namely a pipe engaging body). In the retainer body 77, side edges or side surfaces extend vertically, respectively, and each of the leg portions 75 is provided integrally with an inwardly directed hook 79 on its leading edge. A leading end portion of the leg portion 75 and the hook 79 define a positioning stop portion. The pipe engaging portion 73 has a generally semi-annular shape with an inner diameter generally equal to an outer diameter of the pipe 81. The pipe engaging portion 73 integrally includes the outer wall portion 85 that protrudes in one axial direction on an outer periphery of its one axial end surface. The outer wall portion 85 has a generally semi-circular shape with an inner diameter greater than an outer diameter of the annular engaging projection 83 of the pipe 81. The outer wall portion 85 is formed with a deep cutout extending from its one axial edge on its widthwise middle portion. Meanwhile, the pipe engaging portion 73 also integrally includes an inner protruding portion 87 of semicircular shape that protrudes slightly in one axial direction, on an inner peripheral rim portion of one axial end surface thereof. Further, an inner surface of the pipe engaging portion 73 is formed with a slit 89 on its widthwise center, the slit 89 facilitates opening, widening or deformation of the retainer 5 or the pipe engaging portion 73 in a widthwise direction. The slit 89 separates the inner protruding portion 87 (the inner protruding portion 87 has an inner diameter generally equal to the outer diameter of the pipe 81, and equal to an inner diameter of an inner surface of the pipe engaging portion 73, excluding the inner protruding portion 87) into two sections.

Each of the pair of leg portions 75, 75 includes an inner surface curved at a curvature or a diameter generally equal to the outer diameter of the annular engaging projection 83 of the pipe 81, and are disposed so as to permit the annular engaging projection 83 to pass therethrough (so as to permit the annular engaging projection 83 to pass through inside the retainer body 77). Each of the leg portions 75 is formed with a moving mechanism 90 including a deformative portion 91 arranged so as to protrude in one axial direction at one axial end of a leading end (lower end) thereof. The deformative portion 91 includes an inner surface that is gradually sloped or curved inwardly toward one axial direction, respectively. On each of the deformative portions 91 (more specifically, upper edge of each deformative portion 91), a spring member 93 extends upwardly. The spring member 93 extends upwardly in inwardly curved manner so as to be slightly raised outwardly, and is curved reversely in an outward direction (widthwise outward direction), at its upper end portion such that a leading end portion 95 projects slightly outwardly with respect to a side edge of the retainer body 77. So, the leading end portions 95 are located close to or adjacent to opposite end portions or widthwise opposite end portions of the outer wall portion 85, respectively. The hook 79 is formed integrally on a leading edge or a leading end portion (lower end) of the deformative portion 91 and bent inwardly into L-shape.

Thus constructed retainer 5 is fitted in the retainer mounting portion 25 via an upper opening such that the leading end portions 95 of the spring members 93 enter in the guide recesses 57 to abut or contact with the support stepped portions 59, and leading end portions of the leg portions 75 and the hooks 79 engage with the first positioning engagement portion 69 by pinching vertically opposite ends (upper and lower ends) of the first projecting portions 63. Thereby the retainer 5 is positioned or located at the inserting position (refer to FIG. 5(*b*)). When the retainer 5 is fitted in the retainer mounting portion 25, the hooks 79 abut upper surfaces of the first projecting portions 63 (refer to FIG. 5(*a*)). Here, the retainer 5 is forcibly pushed in, and the hooks 79 are deformed so as to spread outwardly and pass over the first projecting portions 63. Then, the leading end portions of the leg portions 75 and the hooks 79 pinch or grasp widthwise opposite ends of the first positioning engagement portion 69, and engage with the first positioning engagement portion 69. In this state, an upper half of the pipe engaging portion 73 projects upwardly from the upper opening in the retainer mounting portion 25 (refer to FIG. 5(*b*)).

The pipe 81, for example, made of metal, is inserted into the insertion opening 55 (the insertion opening 55 has an inner diameter slightly larger than the outer diameter of the annular engaging projection 83) in the other axial end wall portion 53 of the retainer mounting portion 25 of the quick connector 1 and fitted thereto. The pipe 81 has a straight tubular inserting portion 97 and one axial end of the inserting portion 97 defines an inserting end portion 99 wherein an annular engaging projection 83 is formed on an outer peripheral surface. The pipe 81 is pressure inserted into the quick connector 1 or the connector housing 3 until the inserting end portion 99 is received over its entire length in the pipe inserting portion 11 of the connector housing 3 in such manner that the annular engaging projection 83 abuts with the deformative portions 91, relatively advances while pushing the deformative portions 91 of the retainer 5 outwardly and expanding a distance between the leg portions 75, 75 of the retainer 5, and is received in the outer wall portion 85 on one axial end with respect to the inner protruding portion 87 (at connecting position) in snap-engaging relation with the pipe engaging portion 73. One axial edge (inserting edge) of the inserting end portion 99 of the pipe 81 passes through the second 0-ring 33 and the first 0-ring 31 and reaches in the transitional portion 29. The first and the second 0-rings 31, 33 provide a seal between the pipe 81 or the inserting end portion 99 of the pipe 81 and the quick connector 1. One axial end of the inserting end portion 99 of the pipe 81 with respect to the annular engaging projection 83 is inserted without play in the resin bush 37 and the transitional portion 29 that have an inner diameter generally equal to an outer diameter of the inserting end portion 99 of the pipe 81.

Figure 5A:
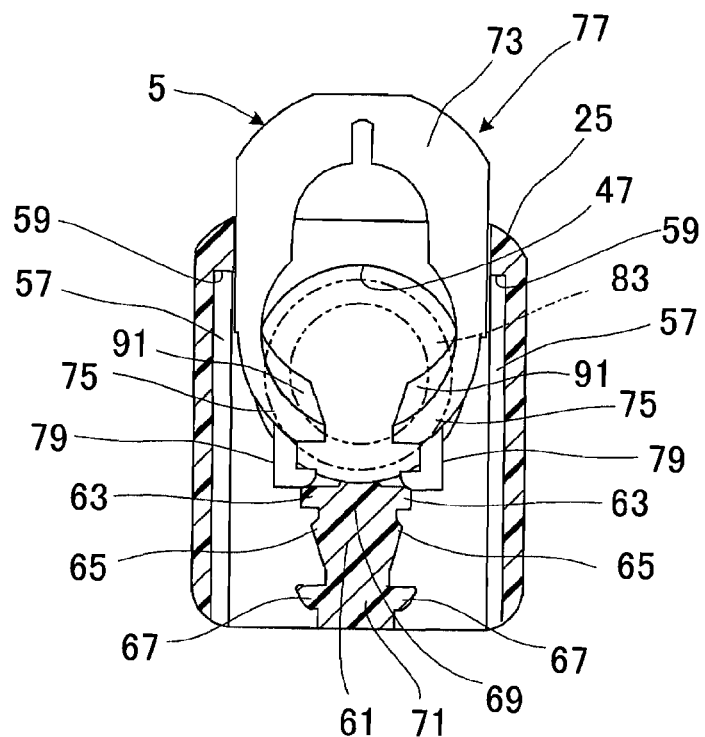
FIG. 5(a) is a view for explaining movement of a retainer along with insertion of the pipe in the connector housing, and showing a state that the retainer is inserted in a retainer mounting portion but before the retainer reaches at an inserting position.
Figure 5B:
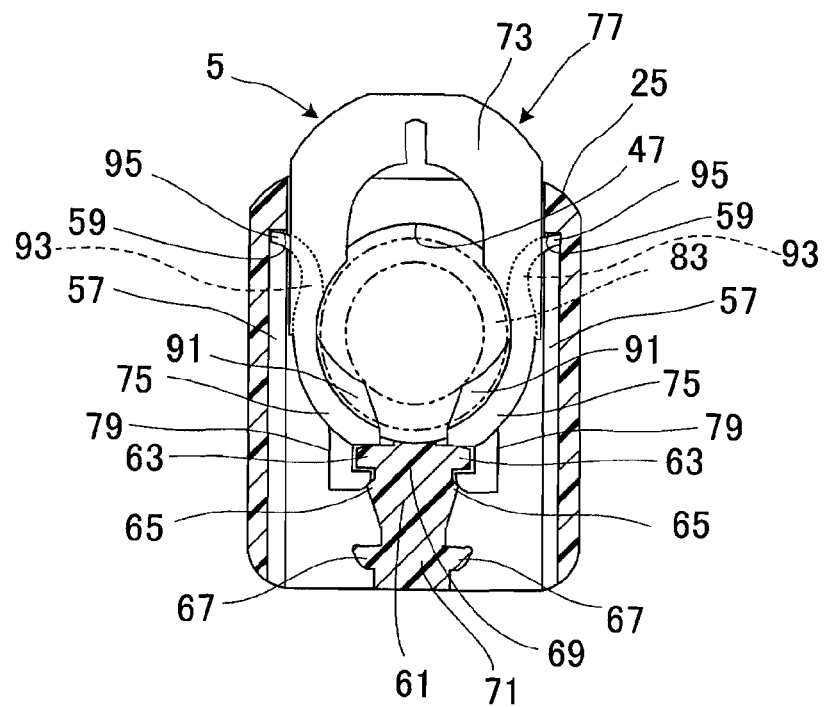
FIG. 5(b) is a view for explaining movement of the retainer along with insertion of the pipe in the connector housing, and showing a state that the retainer is at the inserting position.
Figure 6A:
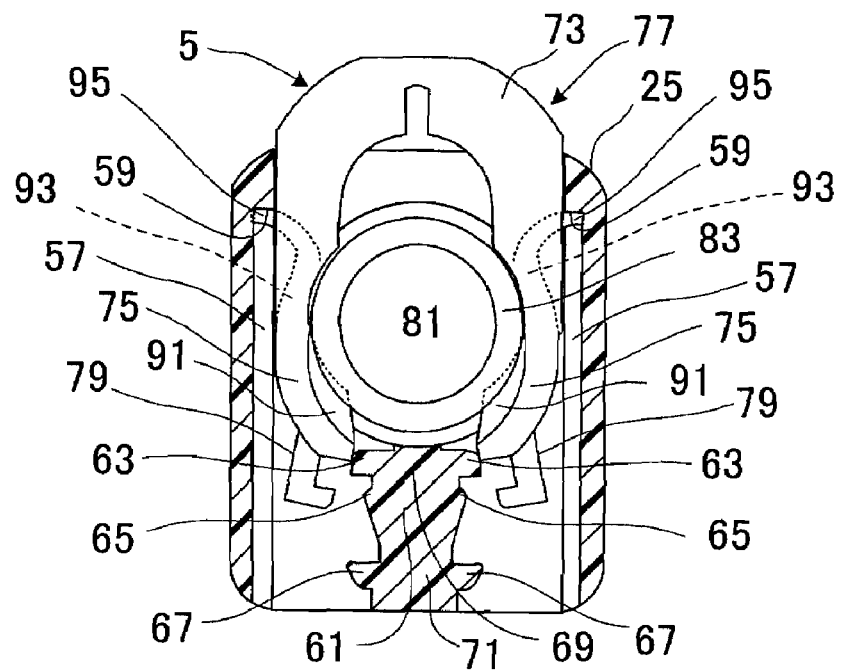
FIG. 6(a) is a view for explaining movement of the retainer along with insertion of the pipe in the connector housing, and showing a state that an annular engaging projection just reaches a connecting position.
Figure 6B:
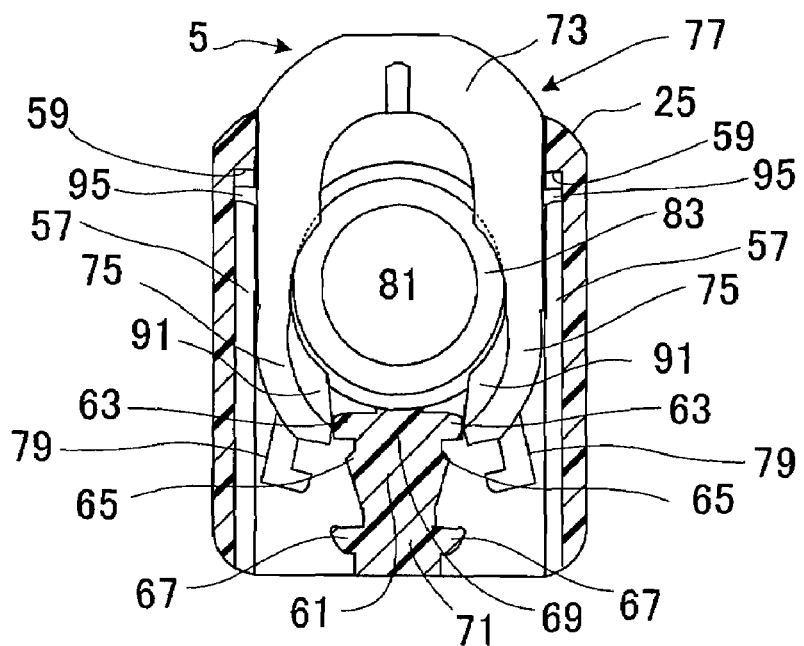
FIG. 6(b) is a view for explaining movement of the retainer along with insertion of the pipe in the connector housing, and showing a state that the retainer starts descending.
Figure 6C:
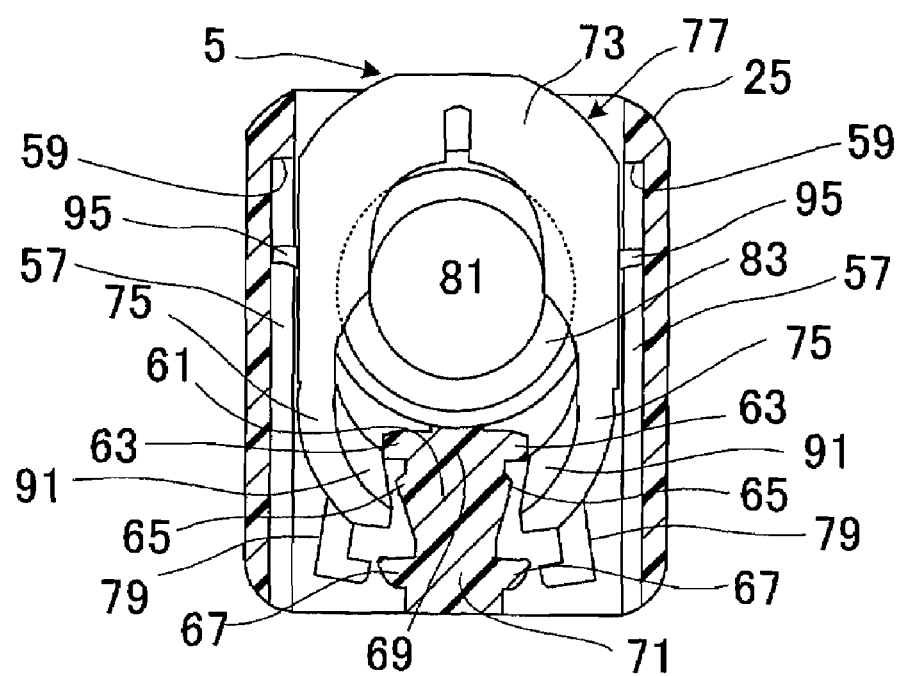
FIG. 6(c) is a view for explaining movement of the retainer along with insertion of the pipe in the connector housing, and showing a state just before the leg portions of the retainer body disengage from first projecting portions of a positioning engagement member.
Figure 7A:
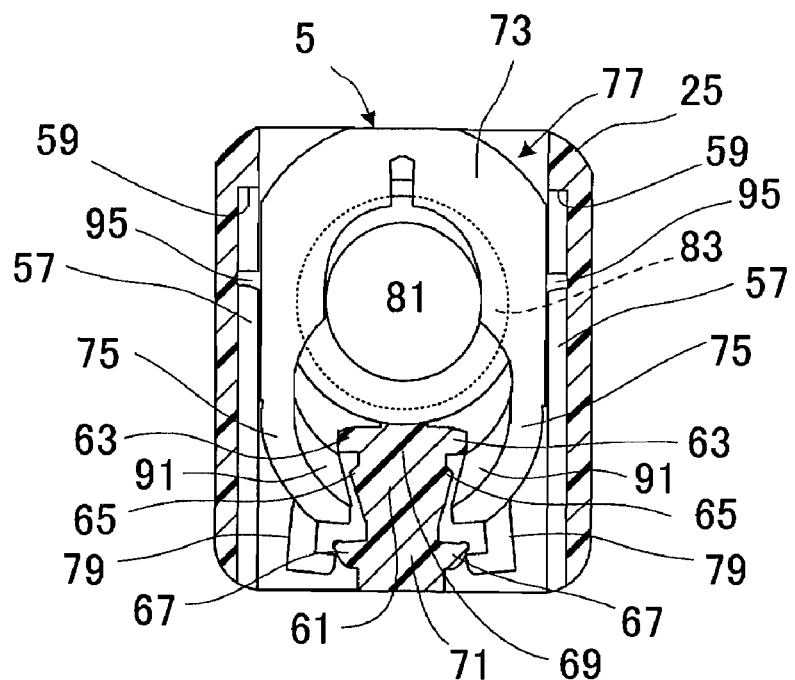
FIG. 7(a) is a view for explaining movement of the retainer along with insertion of the pipe in the connector housing, and showing a state just before inner surfaces of leading end portions of leg portions contact with a portion extending from a protrusive portion to a second projecting portion of the positioning engagement member.
Figure 7B:
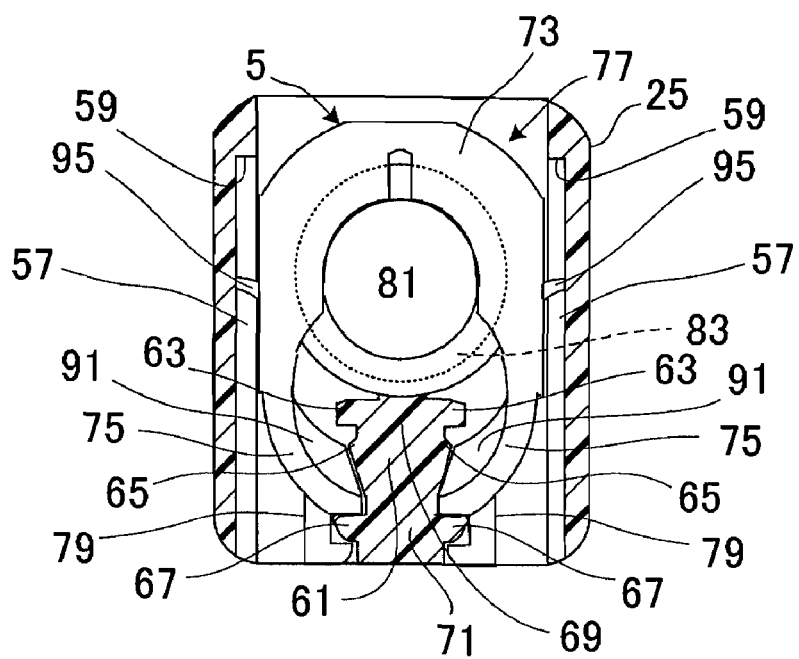
FIG. 7(b) is a view for explaining movement of the retainer along with insertion of the pipe in the connector housing, and showing a state that the retainer is positioned at an engaging position.

When the retainer 5 is inserted and fitted in the retainer mounting portion 25 via the upper opening (FIG. 5(*a*))and disposed at the inserting position (FIG. 5(*b*)), the pair of the leg portions 75, 75 (more specifically, the other axial end of the leg portions 75) are located such that the inner surfaces thereof are coaxially aligned with the insertion aperture 55 and the transit hole 47, and ready to allow the annular engaging projection 83 of the pipe 81 to pass therethrough. However, since inner surfaces of the deformative portions 91 of the leg portions 75 are sloped or curved inwardly, for example, raised inwardly, the annular engaging projection 83 of the pipe 81 that is inserted abuts the inner surfaces of the deformative portions 91, and spreads and deforms the deformative portions 91 outwardly as the annular engaging projection 83 advances. Then, when the annular engaging projection 83 advances to a position beyond the inner protruding portion 87, the leg portions 75 and the hooks 79 are spread and deformed outwardly sufficiently to cancel engagement between the leading end portions of the leg portions 75 and hooks 79 and the first positioning engaging portion 69 (refer to FIG. 6(*a*): the deformative portion 91 extends in one axial end with respect to the inner protruding portion 87 or beyond the inner protruding portion 87). Here, the leading end portions 95 are deformed by restraint of the support stepped portion 59 and accordingly the spring member 93 exerts a spring force to bias the retainer body 77 downwardly. Further, a spring-back force of the leg portions 75 is also cooperatively exerted, when the annular engaging projection 83 reaches the connecting position beyond the inner protruding portion 87, the retainer body 77 or the retainer S descends while sliding the leading end portions 95 of the spring members 93 along the guide recesses 57 and inner surfaces of the leading end portions of the leg portions 75 over side surfaces of the first projection portions 63 with hooks 79 spreading outwardly (refer to FIGS. 6(b) and 6(c)). Then, when the leg portions 75 disengage from the first projecting portions 63, the inner surfaces of the leading end portions of the leg portions 75 pinch and contact with side surfaces of portions extending from the protrusive portions 65 of the positioning engagement members 61 to the second projecting portions 67(refer to FIG. 7(a): FIG. 7(a) shows a state before contact with the side surfaces). When the leg portions 75 disengage projecting portions 63, the hooks 79 are located, for example, outwardly with respect to the second projecting portions 67, while being ready for entering under the second protruding portions 67 by their closing action. Due to a reason that the side surfaces extending from the protrusive portions 65 of the positioning engagement member 61 to the second projecting portions 67 are sloped inwardly toward a lower end or other reason, resistance sufficient to stop movement of the retainer body 77 is not acted on the retainer body 77. So, the retainer 5 descends without stopping during their descent until the retainer 5 is positioned at an engaging position where the leading end portions of the leg portions 75 and the hooks 79 pinch vertical opposite ends of the second projecting portions 67, respectively and pinch or grasp widthwise opposite ends of the second positioning engagement portion 71 in engaging relation therewith (refer to FIG. 7(b)). At the engaging position, the retainer 5 is hidden inside the retainer mounting portion 25. Meanwhile, the spring member for biasing the retainer 5 may be provided on an inner surface of the side wall portion 51 of the retainer mounting portion 25.

In order to disconnect the pipe 81 from the connector housing 3, the retainer 5 is returned to the inserting position or a position toward the inserting position by canceling engagement between the leading end portions of the leg portions 75 and the hooks 79 and the second projecting portions 67. Or the pipe 81 can be disconnected by detaching or removing the retainer 5 from the retainer mounting portion 25 via the upper opening.

With use of the quick connector according to the present invention, for example, for connection in fuel piping of a motor vehicle, highly reliable connection of piping can be arranged smoothly.

What is claimed is:

1. A quick connector for connecting a tube and a pipe having an annular engaging projection, the quick connector, comprising:
   a connector housing provided with a tube connecting portion on one axial end and a retainer mounting portion on the other axial end,
   a retainer mounted in the retainer mounting portion for snap-engaging with the annular engaging projection when the pipe is inserted in the connector housing and the annular engaging projection of the pipe reaches a connecting position;
   wherein;
   the retainer mounting portion has a first positioning engagement portion and a second positioning engagement portion,
   the retainer has a retainer body having a pipe engaging portion, the pipe engaging portion being provided integrally with a pair of leg portions on widthwise opposite ends of the pipe engaging portion, each of the leg portions including a positioning stop portion,
   a moving mechanism for moving the retainer body in a radial direction is provided on the retainer,
   the positioning stop portions are formed so as to engage with the first positioning engagement portion to position the retainer body at an inserting position, and so as to engage with the second positioning engagement portion to position the retainer body at an engaging position that is radially spaced from the inserting position,
   the annular engaging projection advances while spreading the pair of the leg portions outwardly to cancel engaging relation between the positioning stop portions and the first positioning engagement portion by inserting the pipe in the connector housing while the retainer body is positioned at the inserting position,
   the retainer body is automatically moved by the moving mechanism to the engaging position so as to engage the pipe engaging portion with the annular engaging projection in locking relation and the positioning stop portions are positioned in engaging relation with the second positioning engagement portion, once the annular engaging projection of the pipe reaches the connecting position,
   the moving mechanism includes a spring member in the shape of a curved plate piece provided between each leg portion and the retainer mounting portion, the spring member being adapted to be pushed and resiliently deformed by the leg portion for biasing the retainer body in the radial direction toward the engaging position to move the retainer body from the inserting position to the engaging position when the retainer body is positioned at the inserting position and the leg portions are pushed and spread outwardly by the annular engaging projection of the pipe.

2. A quick connector as set forth in claim 1, wherein the retainer body is U-shaped or horseshoe-shaped.

3. A quick connector as set forth in claim 1, wherein the retainer body projects outwardly with respect to the retainer mounting portion at the inserting position, and the outwardly projecting length thereof with respect to the retainer mounting portion changes at the engaging position.

4. A quick connector as set forth in claim 3, wherein the retainer body completely enters inside the retainer mounting portion at the engaging position.

5. A quick connector as set forth in claim 1, wherein the positioning stop portions are formed so as to pinch widthwise opposite ends of the first positioning engagement portion to engage therewith, and so as to pinch widthwise opposite ends of the second positioning engagement portion to engage therewith.

6. A quick connector as set forth in claim 1, wherein the spring member extends from the leg portion in a direction opposite to an inserting direction of the retainer then reaches the retainer mounting portion.

7. A quick connector as set forth in claim 6, wherein the spring member extends in an inwardly curved manner from the leg portion so as to be raised inwardly, then extends outwardly to the retainer mounting portion.

8. A quick connector as set forth in claim 7, wherein the spring member is provided on the leg portion and engages the retainer mounting portion.

9. A quick connector as set forth in claim 6, wherein the spring member is provided on the leg portion and engages the retainer mounting portion.

10. A quick connector as set forth in claim 1, wherein the spring member is provided on the leg portion and engages the retainer mounting portion.

11. A quick connector as set forth in claim 10, wherein the leg portion has a deformative portion, the deformative portion including an inner surface that is adapted to abut the annular engaging projection of the pipe.

12. A quick connector as set forth in claim 11, wherein the inner surface of the deformative portion is gradually sloped or curved inwardly toward one axial direction.

13. A quick connector as set forth in claim 10, wherein the pipe engaging portion has a slit on a widthwise center of an inside or an inner surface of the pipe engaging portion for facilitating opening of the leg portions.

14. A quick connector as set forth in claim 1, wherein the leg portion has a deformative portion, the deformative portion including an inner surface that is adapted to abut the annular engaging projection of the pipe.

15. A quick connector as set forth in claim 14, wherein the inner surface of the deformative portion is gradually sloped or curved inwardly toward one axial direction.

16. A quick connector as set forth in claim 1, wherein the pipe engaging portion has a slit on a widthwise center of an inside or an inner surface of the pipe engaging portion for facilitating opening of the leg portions.

17. A quick connector as set forth in claim 1, wherein the retainer body completely enters inside the retainer mounting portion at the engaging position.

* * * * *